US012756936B2

(12) United States Patent
Wang et al.

(10) Patent No.: US 12,756,936 B2
(45) Date of Patent: Oct. 6, 2026

(54) MODIFICATION METHOD OF IMAGE BRIGHTNESS OF PHOTOGRAPHING SYSTEM

(71) Applicant: ALPHA NETWORKS INC., Hsinchu (TW)

(72) Inventors: Chao-Hsi Wang, Hsinchu City (TW); Kao-Wei Hsiao, Hsinchu City (TW)

(73) Assignee: ALPHA NETWORKS INC., Hsinchu (TW)

( * ) Notice: Subject to any disclaimer, the term of this patent is extended or adjusted under 35 U.S.C. 154(b) by 136 days.

(21) Appl. No.: 18/771,165

(22) Filed: Jul. 12, 2024

(65) Prior Publication Data

US 2025/0203219 A1 Jun. 19, 2025

(30) Foreign Application Priority Data

Dec. 18, 2023 (TW) ................................ 112149329

(51) Int. Cl.
*H04N 23/71* (2023.01)
*H04N 23/61* (2023.01)
(Continued)

(52) U.S. Cl.
CPC ............. *H04N 23/71* (2023.01); *H04N 23/61* (2023.01); *H04N 23/72* (2023.01); *H04N 23/73* (2023.01)

(58) Field of Classification Search
CPC ........ H04N 23/72; H04N 23/71; H04N 23/61; H04N 23/73
See application file for complete search history.

(56) References Cited

U.S. PATENT DOCUMENTS

| | | | | |
|---|---|---|---|---|
| 8,350,990 | B2 * | 1/2013 | Fuchikami .......... | G02F 1/13318 349/67 |
| 2011/0012746 | A1 * | 1/2011 | Fish, Jr. ............... | H05B 47/115 340/815.45 |

(Continued)

FOREIGN PATENT DOCUMENTS

| | | | |
|---|---|---|---|
| CN | 105739096 | A | 7/2016 |
| TW | 201822708 | A | 7/2018 |
| TW | 202129624 | A | 8/2021 |

OTHER PUBLICATIONS

Taiwanese Search Report for Taiwanese Application No. 112149329, dated Jul. 14, 2024.

*Primary Examiner* — Lin Ye
*Assistant Examiner* — Steven Daniel Barry
(74) *Attorney, Agent, or Firm* — Birch, Stewart, Kolasch & Birch, LLP

(57) ABSTRACT

A modification method of an image brightness of a photographing system includes: providing a corresponding relationship data; detecting a location data of a moving object by a moving object detection device; obtaining a predetermined image coordinate area corresponding to the location data from the corresponding relationship data according to the location data; obtaining a first image captured by an image capturing device; calculating a first global exposure parameter of the first image and a first local exposure parameter of a first local image, which corresponds to the predetermined image coordinate area, of the first image; obtaining another image captured by the image capturing device, wherein a local image of the another image corresponding to the predetermined image coordinate area has a local exposure parameter being closer to an ideal exposure parameter than the first local exposure parameter; and outputting the another image as a frame of a video.

10 Claims, 11 Drawing Sheets

(51) Int. Cl.

| | |
|---|---|
| ***H04N 23/72*** | (2023.01) |
| ***H04N 23/73*** | (2023.01) |

(56) References Cited

U.S. PATENT DOCUMENTS

| | | | | |
|---|---|---|---|---|
| 2016/0132120 | A1* | 5/2016 | Fan | G06Q 30/0641 348/150 |
| 2019/0052791 | A1* | 2/2019 | Toyoda | H04N 23/667 |
| 2023/0196767 | A1* | 6/2023 | Garcia | G05D 1/0094 348/144 |
| 2023/0267629 | A1* | 8/2023 | Schrama | G06T 5/50 348/207.99 |
| 2023/0401837 | A1* | 12/2023 | Yan | G06T 15/06 |

* cited by examiner

80

| | Predetermined location data | | | | | | |
|---|---|---|---|---|---|---|---|
| | Predetermined angle (°) | | | | | | |
| Predetermined distance (m) | -60° | -40° | -20° | 0° | 20° | 40° | 60° |
| 10m | DATA1 | DATA2 | DATA3 | DATA4 | DATA5 | DATA6 | DATA7 |
| 9m | DATA8 | DATA9 | DATA10 | DATA11 | DATA12 | DATA13 | DATA14 |
| 8m | DATA15 | DATA16 | DATA17 | DATA18 | DATA19 | DATA20 | DATA21 |
| 7m | DATA22 | DATA23 | DATA24 | DATA25 | DATA26 | DATA27 | DATA28 |
| 6m | DATA29 | DATA30 | DATA31 | DATA32 | DATA33 | DATA34 | DATA35 |
| 5m | DATA36 | DATA37 | DATA38 | DATA39 | DATA40 | DATA41 | DATA42 |
| 4m | DATA43 | DATA44 | DATA45 | DATA46 | DATA47 | DATA48 | DATA49 |
| 3m | DATA50 | DATA51 | DATA52 | DATA53 | DATA54 | DATA55 | DATA56 |
| 2m | DATA57 | DATA58 | DATA59 | DATA60 | DATA61 | DATA62 | DATA63 |
| 1m | DATA64 | DATA65 | DATA66 | DATA67 | DATA68 | DATA69 | DATA70 |

FIG. 5

80

| | Predetermined energy (dB) | | | | | | |
|---|---|---|---|---|---|---|---|
| | Predetermined angle (°) | | | | | | |
| Predetermined distance (m) | -60° | -40° | -20° | 0° | 20° | 40° | 60° |
| 10m | 16 | 17 | 19 | 23 | 18 | 17 | 16 |
| 9m | 18 | 19 | 23 | 25 | 23 | 19 | 17 |
| 8m | 20 | 21 | 24 | 27 | 25 | 20 | 19 |
| 7m | 21 | 22 | 26 | 29 | 27 | 22 | 20 |
| 6m | 23 | 24 | 28 | 31 | 30 | 24 | 22 |
| 5m | 26 | 27 | 30 | 33 | 31 | 27 | 24 |
| 4m | 28 | 30 | 32 | 35 | 34 | 30 | 27 |
| 3m | 31 | 32 | 35 | 38 | 37 | 32 | 30 |
| 2m | 36 | 37 | 40 | 42 | 42 | 36 | 33 |
| 1m | 39 | 42 | 44 | 46 | 44 | 42 | 39 |

FIG. 6

MODIFICATION METHOD OF IMAGE BRIGHTNESS OF PHOTOGRAPHING SYSTEM

BACKGROUND OF THE INVENTION

Technical Field

The present invention relates generally to a photographing system, and more particularly to a modification method of an image brightness of a photographing system.

Description of Related Art

A conventional surveillance camera is installed in a place to be surveilled, keeps shooting images of the place, and stores the images as a video. Because the conventional surveillance camera keeps storing the video and keeps shooting the video even without any moving object entering the place, a file size of the video is large and a large storage space is needed to store the video. A modified surveillance camera shoots images without storing the images and stores the images shot as a video until it is determined that the moving object appears in the images. In this way, the file size of the video could be smaller.

Regardless of the conventional surveillance camera or the modified surveillance camera, a distance between the moving object and the surveillance camera changes with a movement of the moving object; for example, when the moving object approaches the surveillance camera, a brightness of a surface of the moving object would possibly increase with the distance reducing; if the brightness of the moving object overexposes, the surveillance camera needs to modify a gain value or an exposure time of an image sensor of the surveillance camera according to the brightness of the images at any time. In the video shot under the aforementioned condition, the brightness of the moving object would suddenly change in the video, such as sudden overexposure or underexposure.

BRIEF SUMMARY OF THE INVENTION

In view of the above, the primary objective of the present invention is to provide a modification method of an image brightness of a photographing system, so that a local image, which corresponds to a moving object, in a frame of a video could obtain a better brightness.

The present invention provides a modification method of an image brightness of a photographing system, wherein the photographing system includes an image capturing device, a moving object detection device, and a processing device; the image capturing device has an image capturing range; the moving object detection device has a detection range; the image capturing range partially overlaps with the detection range; the modification method of the image brightness of the photographing system includes the following steps:

- step A: providing a corresponding relationship data, wherein the corresponding relationship data has a plurality of predetermined location data corresponding to a plurality of predetermined locations in the detection range of the moving object detection device; each of the predetermined location data includes a predetermined image coordinate area corresponding to each of the predetermined locations;
- step B: detecting a location data of a moving object in the detection range by the moving object detection device;
- step C: obtaining the predetermined image coordinate area of one of the predetermined location data, which corresponds to the location data, from the corresponding relationship data by the processing device according to the location data;
- step D: controlling the image capturing device by the processing device for obtaining a first image captured by the image capturing device;
- step E: calculating a first global exposure parameter of a whole of the first image and calculating a first local exposure parameter of a first local image, which corresponds to the predetermined image coordinate area, of the first image by the processing device;
- step F: controlling the image capturing device by the processing device for obtaining another image captured by the image capturing device, wherein a whole of the another image has a global exposure parameter; a local image of the another image corresponding to the predetermined image coordinate area has a local exposure parameter, wherein the local exposure parameter is closer to an ideal exposure parameter than the first local exposure parameter; and
- Step G: outputting the another image as a frame of a video by the processing device.

With the aforementioned design, the brightness of the local image in the another image has been modified to the desirable brightness before the another image is outputted as the frame, so that a sudden change of the brightness of the local image, which corresponds to the moving object, in the frame of the video could be avoided.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 5 is a schematic view, showing the corresponding relationship data according to the first embodiment of the present invention;

FIG. 6 is a schematic view, showing the predetermined energies of the corresponding relationship data according to the first embodiment of the present invention;

DETAILED DESCRIPTION OF THE INVENTION

Figure 1:
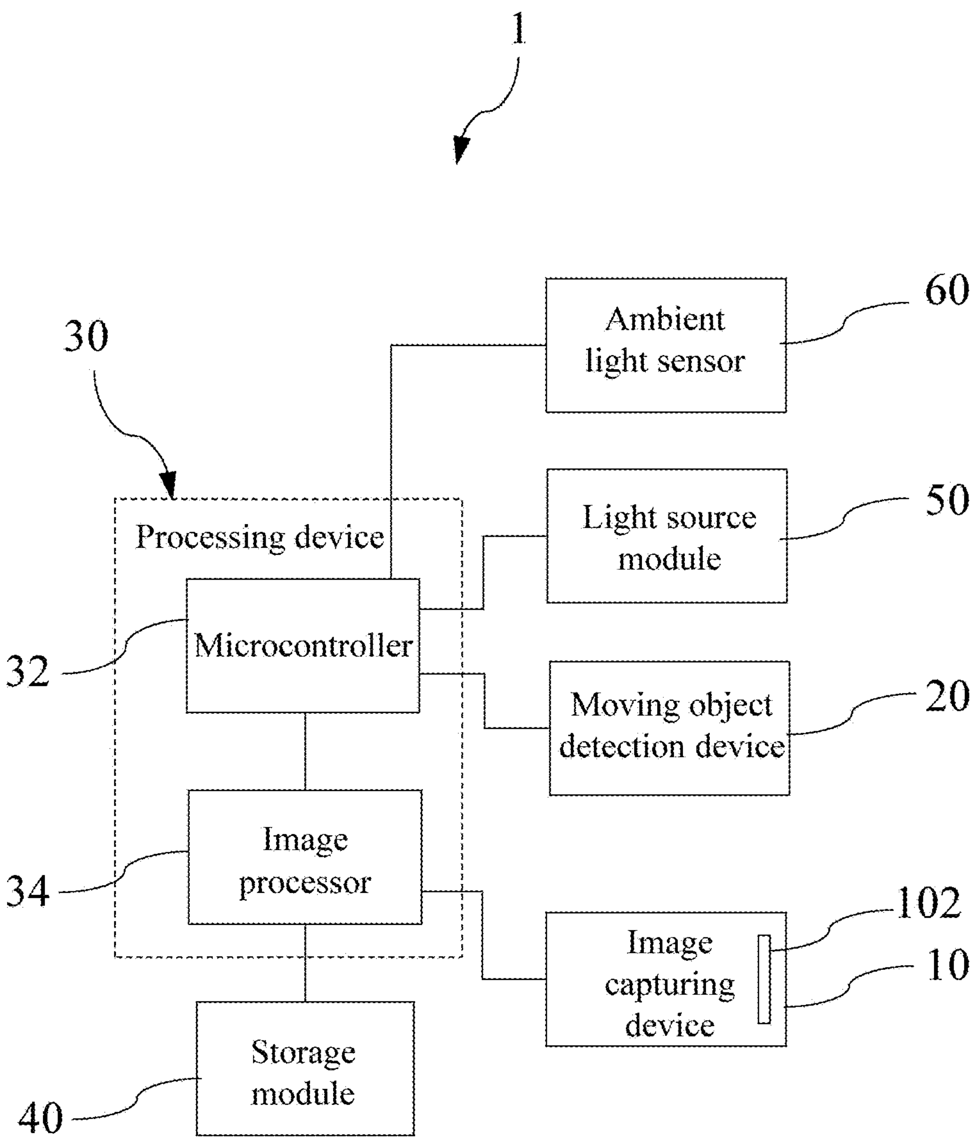
FIG. 1 is a schematic view of the photographing system according to a first embodiment of the present invention.
Figure 2:
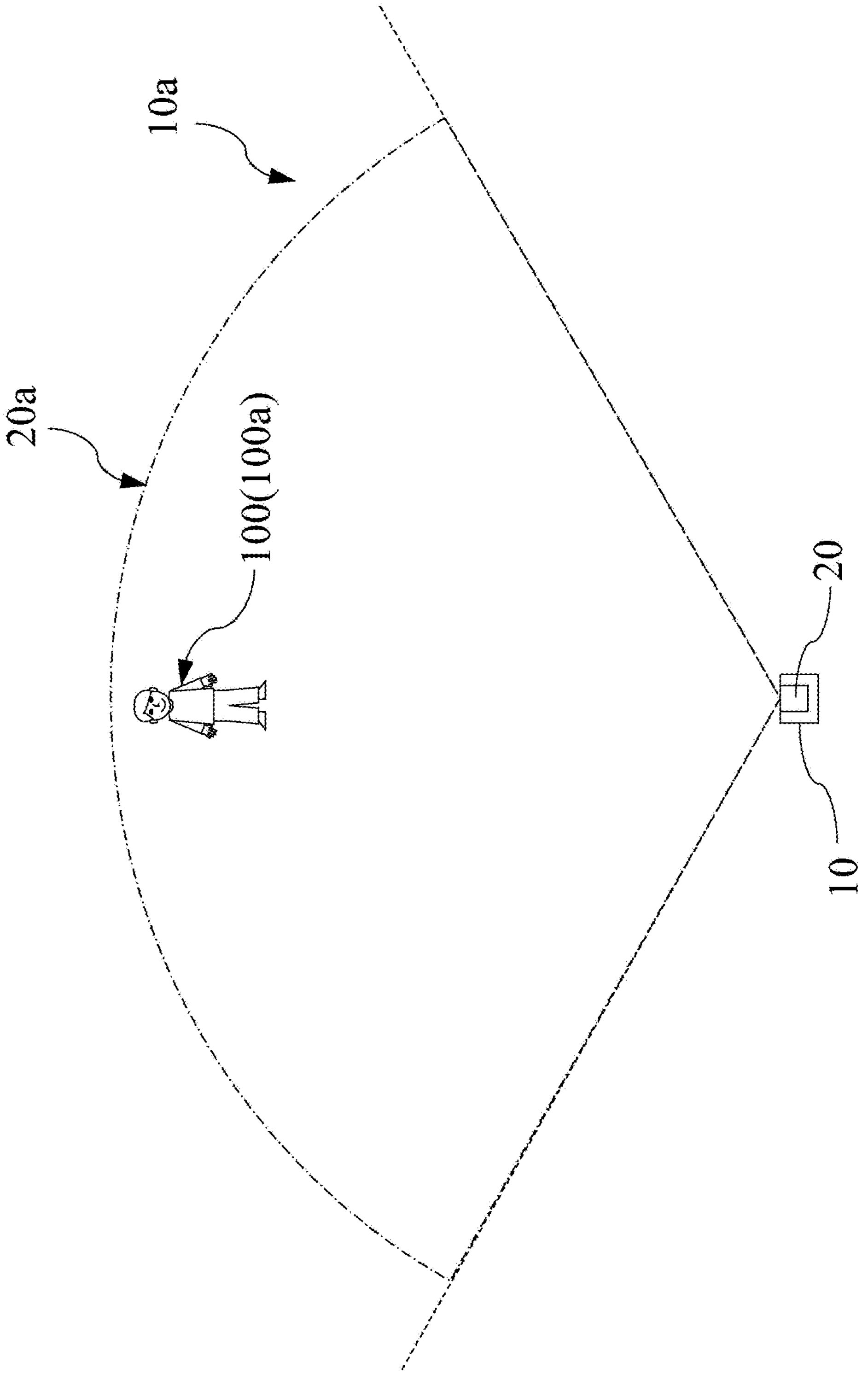
FIG. 2 is a schematic view of the detection range of the moving object detection device and the image capturing range of the image capturing device according to the first embodiment of the present invention.

A photographing system 1 according to a first embodiment of the present invention is illustrated in FIG. 1 and FIG. 2 and includes an image capturing device 10, a moving object detection device 20, and a processing device 30.

The image capturing device 10 has an image capturing range 10*a* and includes an image sensor 102. The image capturing device 10 could be controlled to power up, thereby capturing and outputting a plurality of images corresponding to the image capturing range 10*a* continuously through the image sensor 102. In the current embodiment, an angle of the image capturing range 10*a*, namely an angle of view of the image capturing device 10, could be 120 degrees as an example. A resolution of the images outputted by the image capturing device 10 could be a scale of HD, Full HD, 2K, 4K, or more than 8K.

The moving object detection device 20 and the image capturing device 10 are located in the same place, such as a housing (not shown). The moving object detection device 20 has a detection range 20*a*. When a moving object 100, such as a person 100*a*, enters the detection range 20*a* of the moving object detection device 20, the moving object detection device 20 detects the moving object 100 and then generates a location data corresponding to the moving object 100. An angle of the detection range 20*a* could be 120 degrees as an example. A maximum distance (i.e., radius) of the detection range 20*a* is 10 m as an example. The detection range 20*a* of the moving object detection device 20 partially overlaps with the image capturing range 10*a* of the image capturing device 10. Preferably, the detection range 20*a* is in the image capturing range 10*a*, and the angle of the detection range 20*a* is less than or is equal to the angle of the image capturing range 10*a*.

In the current embodiment, the moving object detection device 20 includes a radar, wherein the radar could be a millimeter wave radar, but not limited thereto. The radar could be an ultrasonic radar or other radars. The location data generated by the radar includes a detection distance, a detection angle, and a detection energy. The detection distance is a distance between the moving object 100 and the radar. The detection angle is a relative angle between the moving object 100 and the radar. The detection energy is an energy reflected by the moving object 100 corresponding to a detection wave sent by the radar. In an embodiment, the moving object detection device 20, besides the radar, could be a light detection and ranging (LiDAR) or an infrared sensor, e.g., pyroelectric infrared sensor (PIR sensor).

The processing device 30 is electrically connected to the image capturing device 10 and the moving object detection device 20, is adapted to receive the location data of the moving object detection device 20 and control the image capturing device 10, and receives the images outputted by the image capturing device 10. In the current embodiment, the processing device 30 includes a microcontroller 32 and an image processor 34 electrically connected to the microcontroller 32. The microcontroller 32 is electrically connected to the moving object detection device 20 to receive the location data generated by the moving object detection device 20. The image processor 34 is electrically connected to the microcontroller 32 and the image capturing device 10, controls the image capturing device 10 for obtaining the images outputted by the image sensor 102 of the image capturing device 10, and could output one of the images outputted by the image sensor 102 of the image capturing device 10 as a frame. The plurality of frames outputted by the image processor 34 could form a video. The image processor 34 is electrically connected to a storage module 40 and stores the video in the storage module 40. The storage module 40 could be a flash memory (e.g., micro SD, eMMC, etc.), a solid-state drive, a hard disk drive, etc.

Figure 3:
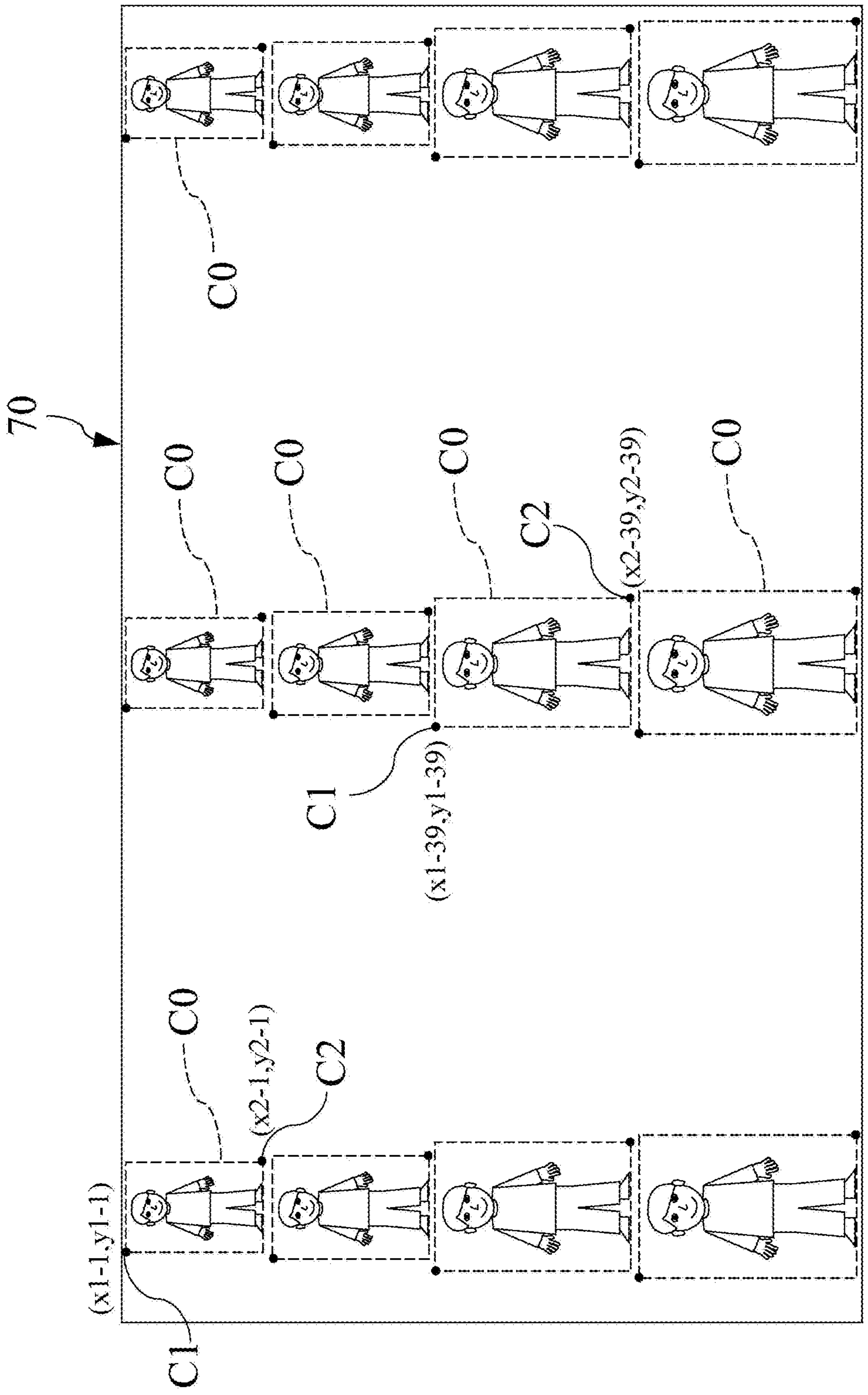
FIG. 3 is a schematic view, showing the predetermined image coordinate area in the image corresponding to the moving object located in different predetermined locations according to the first embodiment of the present invention.

Referring to FIG. 3, the moving object 100 is a person 100*a* as an example. When the same person 100*a* is located in different locations in the image capturing range 10*a* of the image capturing device 10, an area of an image 70 occupied by the person 100*a* in the image 70 outputted by the image capturing device 10 would be greater as the person 100*a* gets closer to the image capturing device 10. On the contrary, the area of the image 70 occupied by the person 100*a* would be less as the person moves away from the image capturing device 10.

Figure 4:
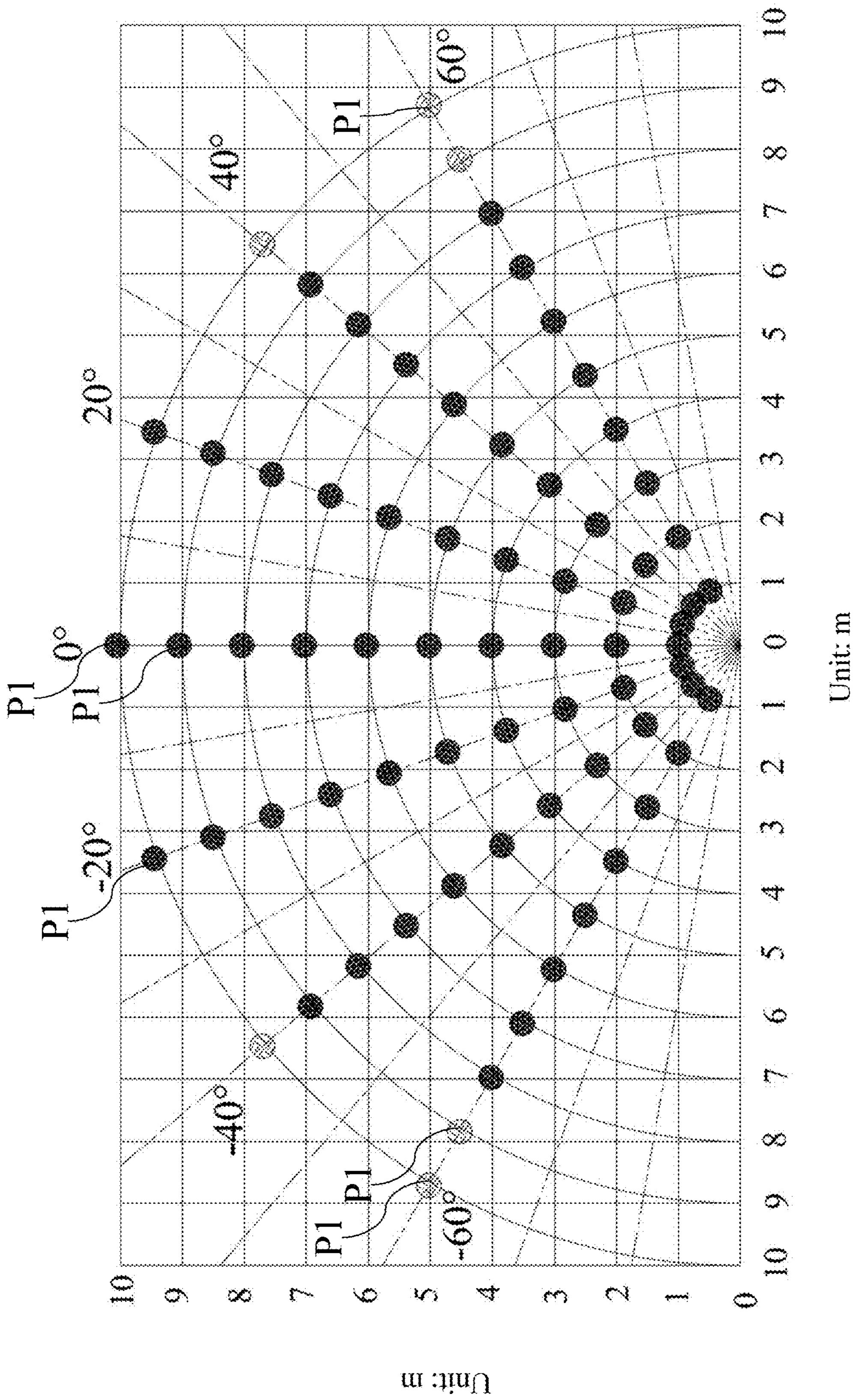
FIG. 4 is a schematic view, showing the predetermined locations of the detection range of the moving object detection device according to the first embodiment of the present invention.

Referring to FIG. 3 to FIG. 6, a corresponding relationship data 80 could be set beforehand and includes a plurality of predetermined location data corresponding to a plurality of predetermined locations P1 (as shown in FIG. 4) in the detection range 20*a* of the moving object detection device 20, wherein each of the predetermined location data includes a predetermined image coordinate area C0 corresponding to each of the predetermined locations P1. Referring to FIG. 4, in the current embodiment, the predetermined location data are set corresponding to the predetermined locations P1 in the detection range 20*a* of the moving object detection device 20; the predetermined locations P1 in the detection range 20*a* are spaced apart from one another by 1 m and are respectively located on a plurality of extension lines which are spaced apart from one another by an angle of 20 degrees. Referring to FIG. 4, there are seventy predetermined locations P1 as an example, but not limited thereto. When the same person 100*a* stands in each of the predetermined locations P1, the image capturing device 10 captures one image and a range of the image occupied by the person 100*a* in the image captured by the image capturing device 10 is estimated by the image processor 34 and is set as each of the predetermined image coordinate areas C0. Each of the predetermined image coordinate areas C0 is constituted by a range between two coordinate points C1, C2. Referring to FIG. 5 and FIG. 6, the corresponding relationship data 80 could be a corresponding table or a data array as an example. The corresponding relationship data 80 totally has seventy predetermined locations P1; the predetermined location data corresponding to the predetermined locations P1 are represented by DATA1~DATA70.

In the current embodiment, each of the predetermined location data further includes a predetermined distance, a predetermined angle, and a predetermined energy. Each of the predetermined distances is a distance between each of the predetermined locations P1 and the moving object detection device 20. Each of the predetermined angles is an angle of each of the predetermined locations P1 relative to the moving object detection device 20. Each of the predetermined energy is a detection energy detected by the moving object detection device 20 as the same person 100*a* is located in each of the predetermined locations P1.

For example, referring to FIG. 3, FIG. 5, and FIG. 6, in one of the predetermined location data DATA1, the predetermined image coordinate area C0 is an area from a coordinate point C1 (x1-1,y1-1) to a coordinate point C2 (x2-1,y2-1); the predetermined distance is 10 m; the predetermined angle is 60°; the predetermined energy is 16 dB. In another one of the predetermined location data DATA39, the predetermined image coordinate area C0 is an area from a coordinate point C1 (x1-39,y1-39) to a coordinate point C2 (x2-39,y2-39); the predetermined distance is 5 m; the predetermined angle is 0°; the predetermined energy is 33 dB.

In addition, the predetermined distance of each of the predetermined location data could correspondingly have a predetermined distance range; the predetermined angle of each of the predetermined location data could correspondingly have a predetermined angle range; the predetermined energy of each of the predetermined location data could correspondingly have a predetermined energy range. For example, a minimum value of each of the predetermined distance ranges is the predetermined distance minus 0.4 m; a maximum value of each of the predetermined distance ranges is the predetermined distance plus 0.5 m; a minimum value of each of the predetermined angle ranges is the predetermined angle minus 9°; a maximum value of each of the predetermined angle ranges is the predetermined angle plus 10°; a minimum value of each of the predetermined energy ranges is the predetermined energy minus 3~5 dB and hereafter the minimum value of each of the predetermined energy ranges is the predetermined energy minus 3 dB as an example; a maximum value of each of the predetermined energy ranges is the predetermined energy plus 3~5 dB and hereafter each of the predetermined energy ranges is the predetermined energy plus or minus 3 dB as an example. In other words, in one of the predetermined location data DATA1, the predetermined distance range corresponding to the predetermined distance (10 m) is 9.6 m~10.5 m; the predetermined angle range corresponding to the predetermined angle (−60°) is −69°~−50°; the predetermined energy range corresponding to the predetermined energy (16 dB) is 13 dB~19 dB. In another one of the predetermined location data DATA39, the predetermined distance range corresponding to the predetermined distance (5 m) is 4.6 m~5.5 m; the predetermined angle range corresponding to the predetermined angle (0°) is −9°~+10°; the predetermined energy range corresponding to the predetermined energy (33 dB) is 30 dB~36 dB.

The predetermined energy and the predetermined energy range are set to correspond to the moving object 100 being a human being. When the energy detected by the radar is less than the minimum value of the predetermined energy range, the moving object 100 would be determined as a small object instead of a human being. When the energy detected by the radar is greater than the maximum value of the predetermined energy range, the moving object 100 would be determined as a large object instead of a human being.

In the current embodiment, the photographing system 1 could selectively include a light source module 50 and an ambient light sensor 60, wherein the light source module 50 and the ambient light sensor 60 are electrically connected to the processing device 30, such as the microcontroller 32 of the processing device 30. The light source module 50 could be controlled to change a luminous intensity of the light source module 50. A light emitted by the light source module 50 illuminates the image capturing range 10*a*. The ambient light sensor 60 detects an ambient illuminance of an environment in which the photographing system 1 is located. The microcontroller 32 of the processing device 30 determines whether to activate the light source module 50 according to the ambient illuminance. For example, when the ambient illuminance is enough during a daytime, a light source of the light source module 50 would not be activated. The microcontroller 32 of the processing device 30 could control the luminous intensity of the light source module 50 according to the location data of the moving object detection device 20, thereby adaptively adjusting the luminous intensity of the light source module 50 to correspond to the distance between the moving object 100 and the radar. When the moving object 100 approaches the radar, the luminous intensity of the light source module 50 decreases. When the moving object 100 moves away from the radar, the luminous intensity of the light source module 50 increases.

When the photographing system 1 is in a standby mode, the microcontroller 32 of the processing device 30, the image processor 34 of the processing device 30, and the image capturing device 10 get into a standby state to save an electricity consumption. Particularly, when a power source of the photographing system 1 is a battery, an electric power of the battery could be saved.

Figure 7:
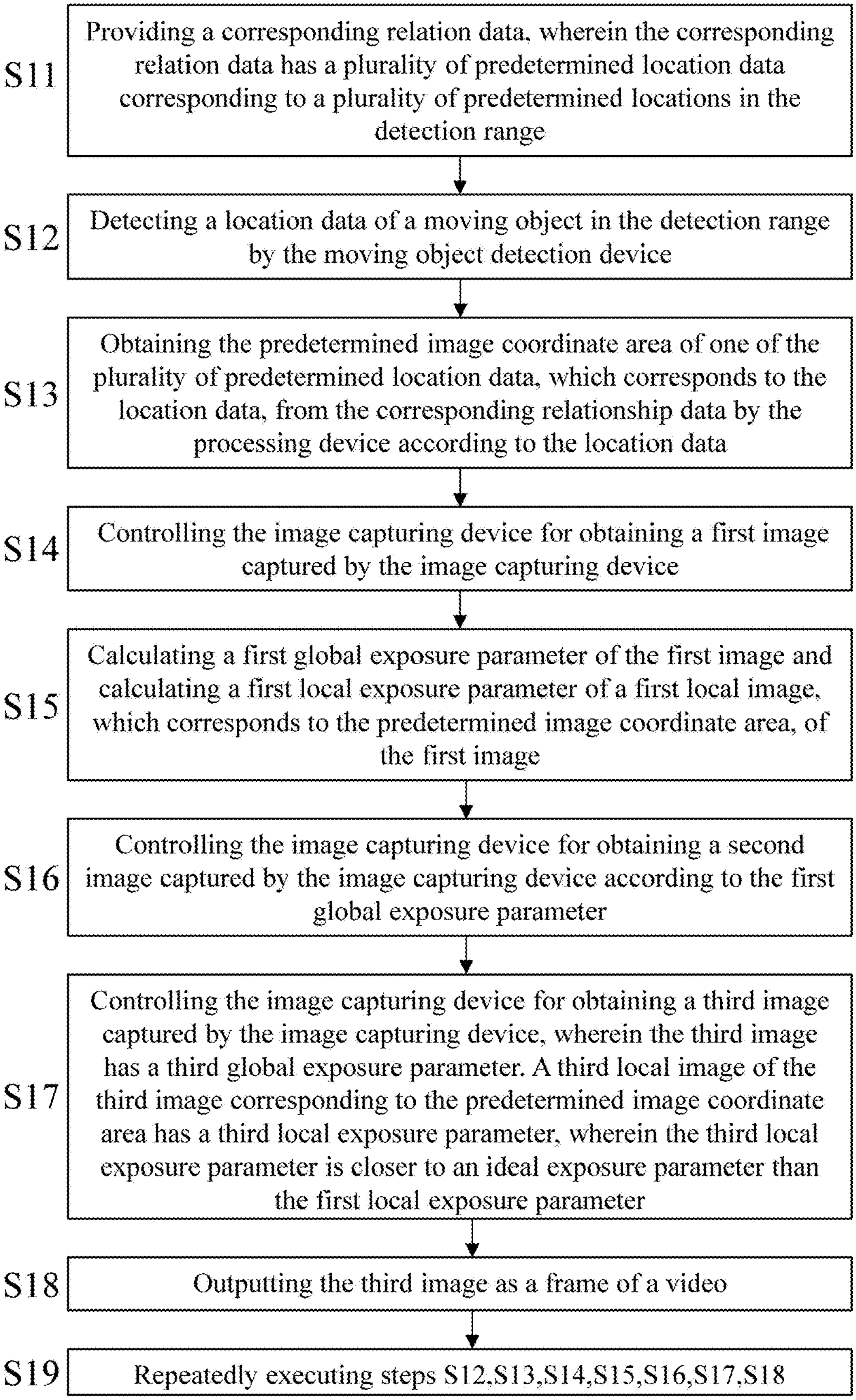
FIG. 7 is a flow chart of the modification method of the image brightness according to the first embodiment of the present invention.

Through the aforementioned configuration of the photographing system 1, a modification method of an image brightness of the photographing system 1 according to the first embodiment of the present invention could be executed. Referring to FIG. 7, the modification method of the image brightness of the photographing system 1 includes the following steps:

Step S11: the corresponding relationship data 80 is provided and has the predetermined location data corresponding to the predetermined locations P1 in the detection range 20*a* of the moving object detection device 20. Each of the predetermined location data includes the predetermined image coordinate area C0 corresponding to each of the predetermined locations P1. In the current embodiment, the corresponding relationship data 80 could be stored in a memory (not shown) of the processing device 30, wherein the memory could be a built-in memory of the image processor 34 or an external memory electrically connected to the image processor 34 as an example. Each of the predetermined location data further includes the predetermined distance, the predetermined angle, the predetermined energy, the predetermined distance range corresponding to the predetermined distance, the predetermined angle range corresponding to the predetermined angle, and the predetermined energy range corresponding to the predetermined energy.

Step S12: a location data of the moving object 100 in the detection range 20*a* is detected by the moving object detection device 20.

In the current embodiment, when the moving object detection device 20 detects that the moving object 100 enters the detection range 20*a*, the microcontroller 32 is woken by the moving object detection device 20; the moving object detection device 20 transmits the location data detected by the moving object detection device 20 to the microcontroller 32, wherein the location data includes the detection distance, the detection angle, and the detection energy. The microcontroller 32 wakes the image processor 34 and transmits the location data to the image processor 34.

In the current embodiment, the modification method of the image brightness of the photographing system 1 could include a detecting step of the ambient illuminance, wherein the detecting step of the ambient illuminance includes:

the ambient light sensor 60 detects the ambient illuminance and transmits the ambient illuminance detected to the microcontroller 32 of the processing device 30; the microcontroller 32 determines whether to control the light source module 50 to implement a fill lighting according to the ambient illuminance. When the microcontroller 32 determines that the ambient illuminance is less than a predetermined illuminance, which represents that the ambient illuminance is currently insufficient, the microcontroller 32 of the processing device 30 controls the light source module 50 to activate and a controlling step of a light source is executed.

The controlling step of the light source includes:

the processing device 30, such as the microcontroller 32, controls the luminous intensity of the light source module 50 according to the detection distance, so that the luminous intensity of the light source module 50 is inversely proportional to the detection distance. In this way, the fill lighting could be adaptively implemented to the moving object 100 in the image capturing range 10*a*, so that when the image capturing device 10 captures the image, a proper exposure value corresponding to the moving object 100 could be obtained.

The detecting step of the ambient illuminance and the controlling step of the light source are executed in, but not limited to, step S12; the detecting step of the ambient illuminance and the controlling step of the light source could be executed before step S14, such as in step S13 or in both step S12 and step S13.

Step S13: the processing device 30 obtains the predetermined image coordinate area C0 of the predetermined location data corresponding to the location data from the corresponding relationship data 80 according to the location data.

The image processor 34 of the processing device 30 selects the predetermined location data including the predetermined distance corresponding to the detection distance and the predetermined angle corresponding to the detection angle from the corresponding relationship data 80 according to the detection distance of the location data and the detection angle of the location data and then obtains the predetermined image coordinate area C0 corresponding to the predetermined location data according to the predetermined location data selected.

For example, the location data detected by the moving object detection device 20 includes the detection distance of 5 m and the detection angle of 0°. After the image processor 34 receives the location data from the microcontroller 32, the image processor 34 selects the predetermined location data DATA39 including the predetermined distance corresponding to the detection distance and the predetermined angle corresponding to the detection angle from the corresponding relationship data 80 according to the detection distance of 5 m and the detection angle of 0° and then correspondingly obtains the predetermined image coordinate area C0 according to the predetermined location data DATA39 selected, i.e., the area from the coordinate point (x1-39,y1-39) to the coordinate point (x2-39,y2-39).

The predetermined location data DATA39 correspondingly obtained is that the detection distance of the moving object detection device 20 and the detection angle of the moving object detection device 20 are respectively equal to the predetermined distance of the predetermined location data and the predetermined angle of the predetermined location data as an example. However, when the moving object 100 moves in the detection range 20*a*, the moving object 100 might be located between adjacent two of the predetermined locations P1. At that time, one predetermined location data corresponding to one of the predetermined locations P1, which is closer to the moving object 100, could be obtained as illustrated below.

When the image processor 34 of the processing device 30 determines that the detection distance of the location data is between the predetermined distances of adjacent two of the predetermined location data, the predetermined location data with the predetermined distance corresponding to the predetermined distance range, which covers the detection distance, would be selected. When the image processor 34 of the processing device 30 determines that the detection angle of the location data is between the predetermined angles of adjacent two of the predetermined location data, the predetermined location data with the predetermined angle corresponding to the predetermined angle range, which covers the detection angle, would be selected. In this way, the predetermined location data with the predetermined distance corresponding to the detection distance and the predetermined angle corresponding to the detection angle would be selected, so that the predetermined location data corresponding to one of the predetermined locations P1, which is closer to the moving object 100, could be obtained. For example, when the detection distance of the location data is a value from 4.6 m to 5.5 m and the detection angle is 3°, the image processor 34 selects the predetermined distance of 5 m corresponding to the predetermined distance range between 4.6 m and 5.5 m, which covers the detection distance, and selects the predetermined angle of 0° corresponding to the predetermined angle range from −9° to +10°, which covers the detection angle of 3°, so that the predetermined image coordinate area C0 of the predetermined location data DATA39 could be obtained.

In the current embodiment, after the predetermined location data is obtained, the image processor 34 of the processing device 30 correspondingly obtains the predetermined energy range according to the predetermined location data DATA39 selected and determines whether the detection energy detected by the moving object detection device 20 is within the predetermined energy range (30 dB~36 dB), e.g., the detection energy of 32 dB. When the image processor 34 of the processing device 30 determines that the detection energy is within the predetermined energy range, the image processor 34 regards the moving object 100 as a human being and step S14 would be executed according to the predetermined image coordinate area C0 correspondingly obtained from the predetermined location data DATA39. When the image processor 34 of the processing device 30 determines that the detection energy is greater than or less than the predetermined energy range, the image processor 34 regards the moving object 100 as not a human being and step S12 would be executed again. Selectively, the image processor 34 first wakes the image capturing device 10, controls the image capturing device 10 for obtaining an image, outputs the image as a frame of a video, and then stores the frame of the video in the storage module 40 and step S12 would be executed again.

Figure 8:
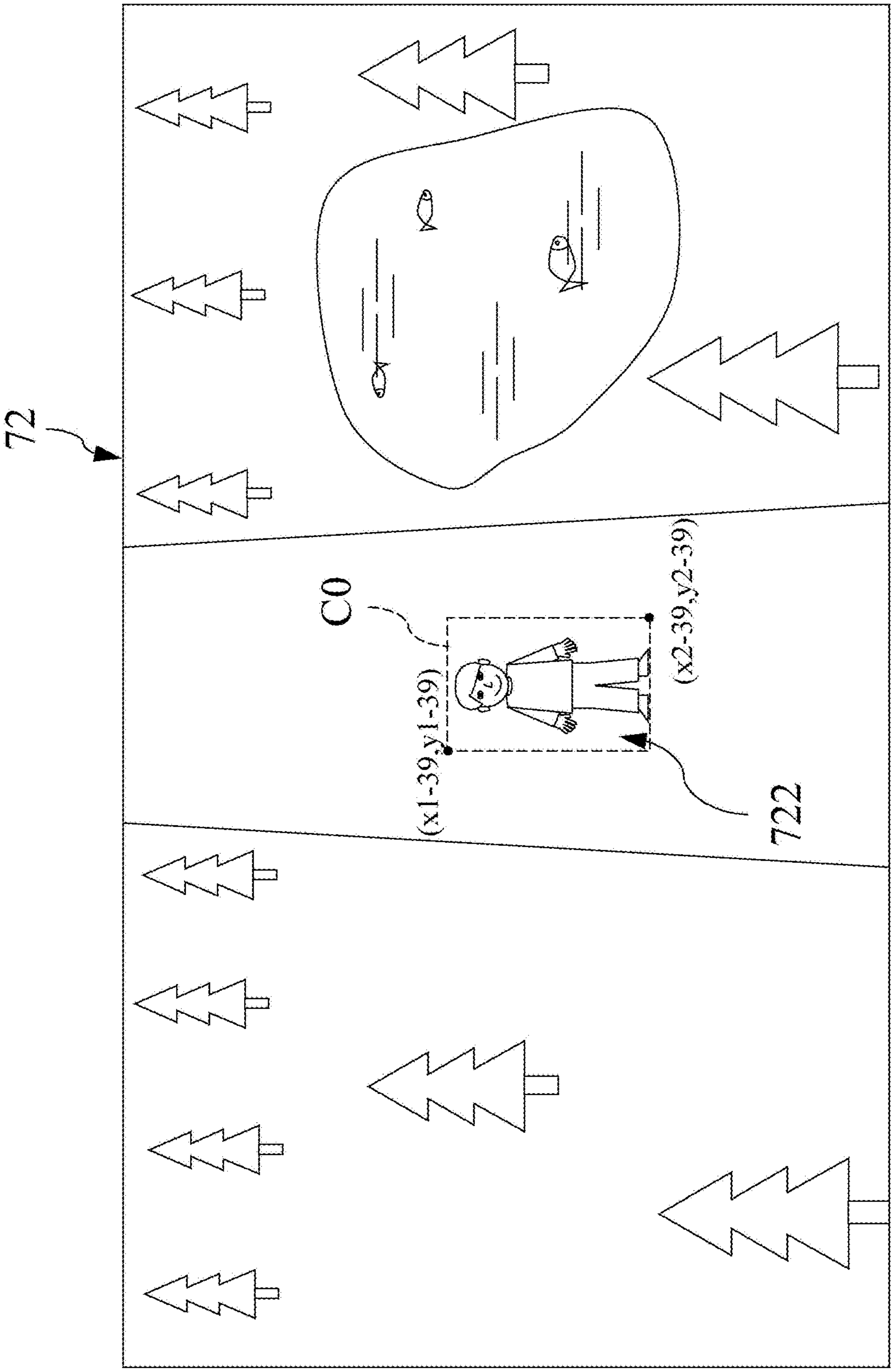
FIG. 8 is a schematic view, showing the first image and the first local image according to the first embodiment of the present invention.

Step S14: the processing device 30 controls the image capturing device 10 for obtaining a first image 72 (as shown in FIG. 8) captured by the image capturing device 10. In the current embodiment, the image processor 34 wakes the image capturing device 10 and controls the image capturing device 10 to capture the first image 72 with a first exposure condition. The image capturing device 10 captures the first image 72 by multi-zone metering. The first image 72 is a static image outputted by the image sensor 102. The first exposure condition could be a predetermined exposure condition or could be determined by the microcontroller 32 according to the ambient illuminance detected by the ambient light sensor 60.

Step S15: the processing device 30 calculates a first global exposure parameter of a whole of the first image 72 and calculates a first local exposure parameter of a first local image 722, which corresponds to the predetermined image coordinate area C0, in the first image 72.

In the current embodiment, after the image processor 34 receives the first image 72, the image processor 34 computes the first image 72 to calculate the first global exposure parameter. In the current embodiment, the first global exposure parameter is a first global exposure value as an example. The image processor 34 particularly computes the first local image 722 corresponding to the predetermined image coordinate area C0 to calculate the first local exposure parameter. In the current embodiment, the first local exposure parameter is a first local exposure value as an example. An algorithm for calculating the first global exposure parameter and the first local exposure parameter is a known image processing technique and is not repeated here.

Figure 9:
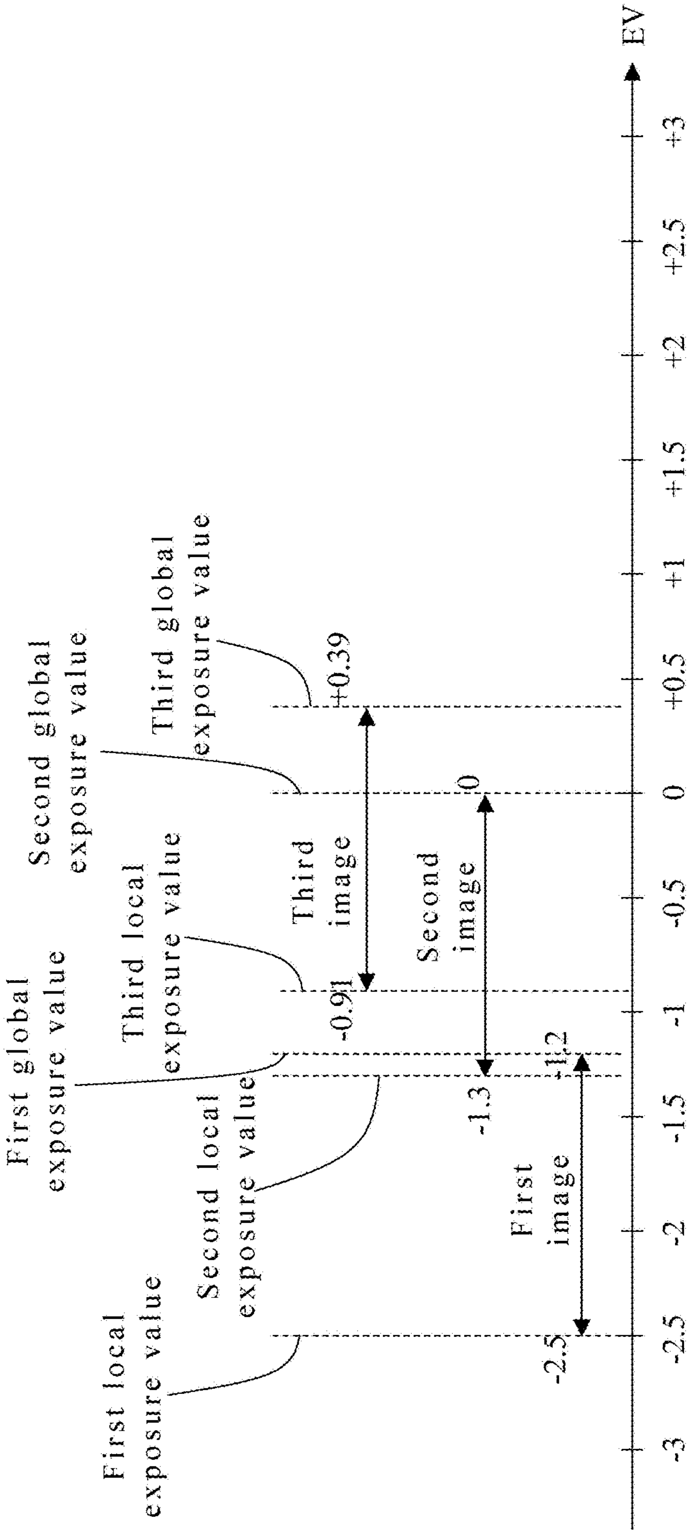
FIG. 9 is a schematic view, showing a change from an exposure value of the first image to an exposure value of a third image according to the first embodiment of the present invention.

For example, referring to FIG. 9, the first global exposure value of the first image 72 is −1.2 EV, and the first local exposure value of the first local image 722 is −2.5 EV, i.e., the first local image 722 is dimmer than the first image 72.

Step S16: the processing device 30 controls the image capturing device 10 for obtaining a second image captured by the image capturing device 10 according to the first global exposure parameter; a whole of the second image has a second global exposure parameter, wherein the second global exposure parameter is an ideal exposure parameter; a second local image, which corresponds to the predetermined image coordinate area C0, in the second image has a second local exposure parameter.

In the current embodiment, the second global exposure parameter is a second global exposure value as an example; the ideal exposure parameter is an ideal exposure value as an example, wherein the ideal exposure value could be, but not limited to, 0 EV.

The image processor 34 controls a second exposure condition of the image capturing device 10 according to the first global exposure value calculated in step S15. Preferably, the image processor 34 controls the second exposure condition of the image capturing device 10 to capture the second image according to a difference obtained by subtracting the first global exposure value from the ideal exposure value, so that the second global exposure value of the whole of the second image is equal to the ideal exposure value and the second image is a static image outputted by the image sensor 102. In other words, a purpose of step S16 is that the image capturing device 10 could obtain the second image of which an overall exposure value is equal to the ideal exposure value.

For example, referring to FIG. 9, the difference obtained by the image processor 34 which subtracts the first global exposure value (−1.2 EV) from the ideal exposure value (0 EV) is +1.2 EV. The image processor 34 controls the second exposure condition of the image capturing device 10 by the difference (+1.2 EV). For example, the image capturing device 10 captures the second image by multi-zone metering and the difference (+1.2 EV). In this way, the second global exposure value of the whole of the second image being equal to the ideal exposure value (0 EV) could be obtained; the second local exposure value of the second local image of the second image is −1.3 EV, i.e., the first local exposure value (−2.5 EV) plus the difference (+1.2 EV).

Step S17: the processing device 30 controls the image capturing device 10 for obtaining a third image captured by the image capturing device 10, wherein a whole of the third image has a third global exposure parameter. A third local image of the third image corresponding to the predetermined image coordinate area C0 has a third local exposure parameter, wherein the third local exposure parameter is closer to the ideal exposure parameter than the first local exposure parameter. The third image, the third global exposure parameter, the third local image, and the third local exposure parameter respectively represent another image, a global exposure parameter, a local image, and a local exposure parameter being defined in the present invention.

In the current embodiment, the processing device 30 controls the image capturing device 10 for obtaining the third image captured by the image capturing device 10 according to a difference between the second global exposure parameter and the second local exposure parameter. The third local exposure parameter is closer to the ideal exposure parameter than the second local exposure parameter and the first local exposure parameter. The third image is a static image outputted by the image sensor 102.

For example, the difference obtained by the image processor 34 which subtracts the second local exposure value (−1.3 EV) from the second global exposure value (0 EV) is +1.3 EV. The image processor 34 controls a third exposure condition of the image capturing device 10 according to the difference (+1.3 EV). In this way, the third local exposure value is closer to the ideal exposure parameter (0 EV) than the second local exposure value (−1.3 EV) could be obtained. More specifically, the image processor 34 multiplies the difference (+1.3 EV) by a proportion to obtain an adjusting value, wherein the proportion could be from 5% to 100% and could be manually selected based on the demand. For example, when the proportion is selected as 30%, the adjusting value is +0.39 EV (i.e., +1.3 EV×30%). The image processor 34 controls the third exposure condition of the image capturing device 10 for capturing the third image according to the adjusting value (+0.39 EV), so that the third global exposure value is equal to the adjusting value (+0.39 EV) and the third local exposure value (−0.91 EV) is different from the second local exposure value (−1.3 EV) by the adjusting value (+0.39 EV). For example, the image capturing device 10 captures the third image by multi-zone metering and the adjusting value (+0.39 EV). At that time, the third global exposure value of the whole of the third image is slightly greater than the ideal exposure value.

If the proportion is selected as 100%, the adjusting value is +1.3 EV (i.e., +1.3 EV×100%). The image processor 34 controls the third exposure condition of the image capturing device 10 for capturing the third image according to the adjusting value (+1.3 EV), so that the third global exposure value is equal to the adjusting value (+1.3 EV) and the third local exposure value is 0 EV. In other words, at that time the third local exposure value is equal to the ideal exposure value (0 EV) and the third global exposure value of the whole of the third image is greater than the ideal exposure value.

Through step S17, the third local image of the third image corresponding to the predetermined image coordinate area C0 could be modified to obtain a desirable brightness.

After step S17, the processing device 30 could execute step S18.

Step S18: the processing device 30 outputs the third image as a frame of a video. The frame could be stored in the storage module 40. Before the third image is outputted as the frame, the brightness of the third local image has been modified. Therefore, the third local image in the video corresponding to the moving object 100 could avoid an abrupt change of the brightness of the third local image.

In the current embodiment, the modification method of the image brightness of the photographing system 1 further includes step S19 after step S18: steps S12, S13, S14, S15, S16, S17, S18 are repeatedly executed to form the video having a plurality of frames.

In the current embodiment, when the moving object detection device 20 detects that the moving object 100 is continuously located in the detection range 20*a*, step S19 would be continuously executed to continuously record the video with the moving object 100 located in the image capturing range 10*a*. When the moving object detection device 20 detects that there is no moving object 100 located in the detection range 20*a*, i.e., the moving object 100 has left from the detection range 20*a*, step S19 would be terminated.

Figure 10:
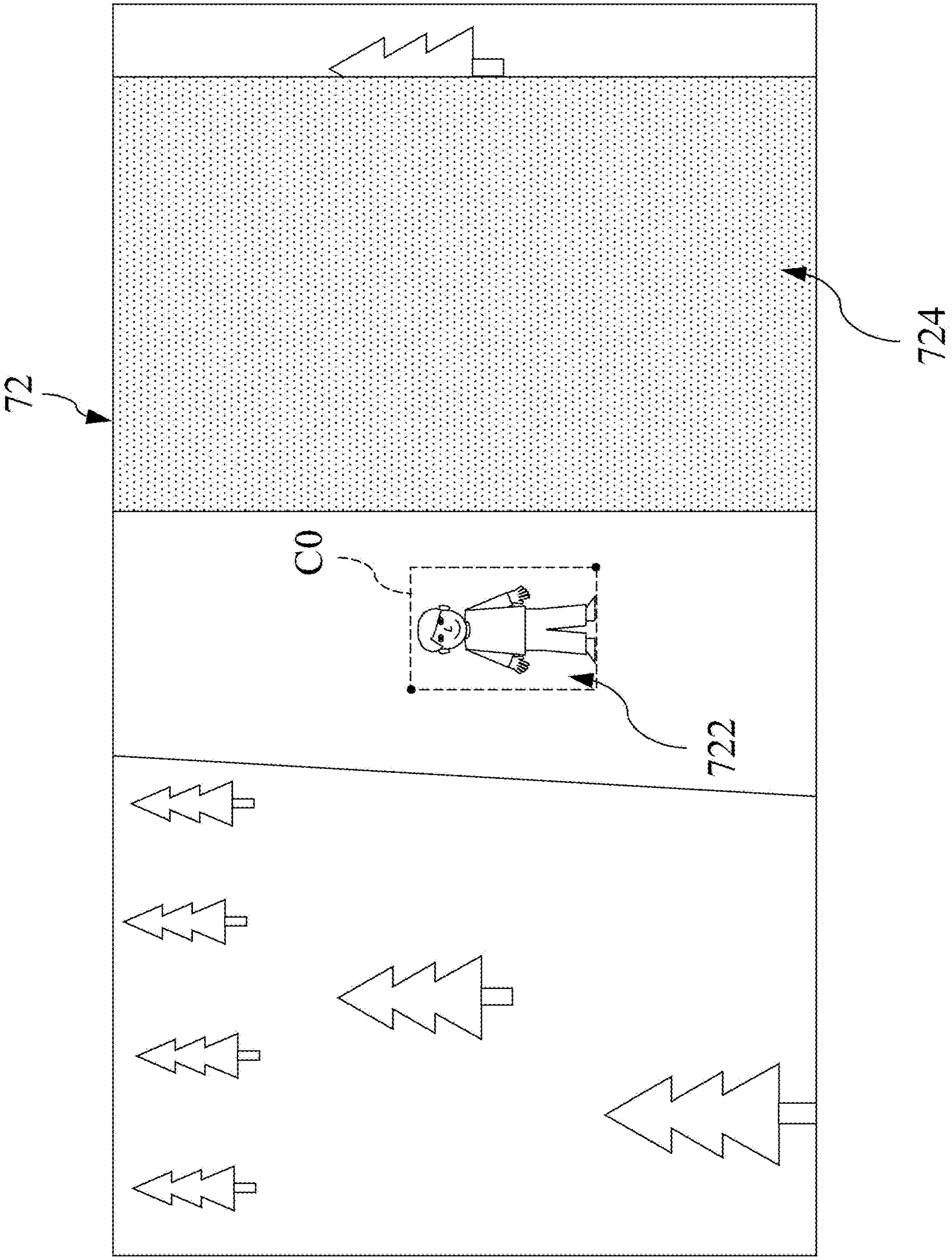
FIG. 10 is a schematic view, showing the first image and the first local image according to a second embodiment of the present invention.

In this way, the moving object detection device 20 detects the location data corresponding to the moving object 100 in the detection range 20*a* and the predetermined image coordinate area C0 is correspondingly obtained, so that no matter the moving object 100 gets close to the image capturing device 10 or gets away from the image capturing device 10, the third local image, which corresponds to the moving object 100, in each of the frames (i.e., each of the third images) in the video could obtain the desirable brightness. Even if the image capturing device 10 is in a backlight state or the image captured by the image capturing device 10 has a covering object 724 (as shown in FIG. 10) with a great area, the third local image of the third image could obtain the desirable brightness.

In a second embodiment of the present invention, step S16 could be skipped, i.e., step S17 is directly executed after step S15: the processing device 30 controls the image capturing device 10 for obtaining the third image captured by the image capturing device 10, so that the third local exposure parameter of the third image is closer to the ideal exposure parameter than the first local exposure parameter.

Figure 11:
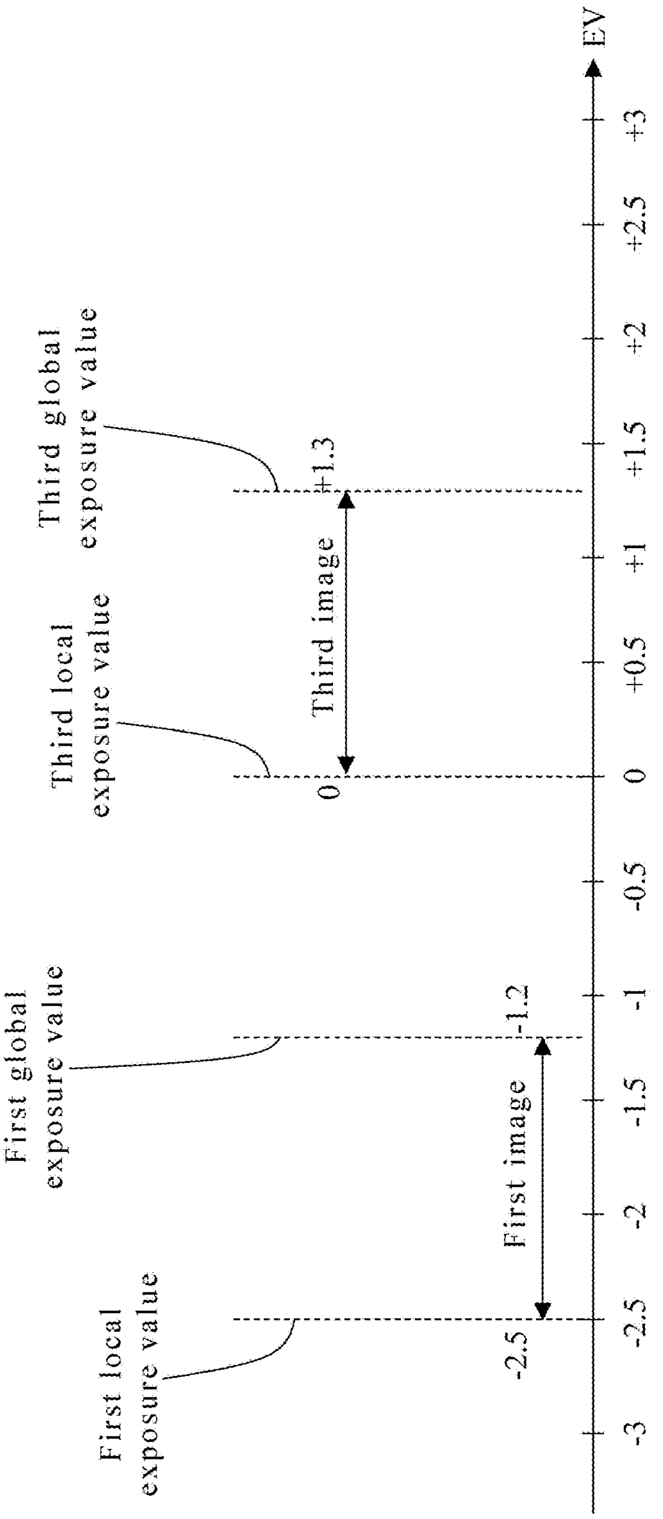
FIG. 11 is a schematic view, showing a change from the exposure value of the first image to the exposure value of the third image according to the second embodiment of the present invention.

For example, referring to FIG. 11, the difference obtained by the image processor 34 which subtracts the first local exposure value (−2.5 EV) from the ideal exposure value (0 EV) is +2.5 EV. The image processor 34 controls the third exposure condition of the image capturing device 10 according to the difference (+2.5 EV). For example, the image capturing device 10 captures the third image by multi-zone metering and the difference (+2.5 EV). In this way, the third local exposure value of the third image being equal to the ideal exposure value (0 EV) could be obtained.

Selectively, the image processor 34 multiplies the difference (+2.5 EV) by a proportion to obtain an adjusting value and controls a third exposure condition of the image capturing device 10 according to the adjusting value. The proportion could be, for example, from 5% to 100%. In this way, the third local exposure parameter of the third image could be closer to the ideal exposure parameter than the first local exposure parameter.

In the first embodiment as shown in FIG. 9 and in the second embodiment as shown in FIG. 11, a global exposure value is greater than a local exposure value as an example for illustration. In practice, the local exposure value could be greater than the global exposure value. The modification method of the image brightness of the photographing system with the global exposure value being greater than the local exposure value is the same as the modification method of the image brightness of the photographing system with the local exposure value being greater than the global exposure value, except that in the modification method of the image brightness of the photographing system with the local exposure value being greater than the global exposure value, the third local exposure value after being modified is less than the first local exposure value and/or the second local exposure value and the third global exposure value after being modified is less than the first global exposure value and/or the second global exposure value.

It must be pointed out that the embodiments described above are only some preferred embodiments of the present invention. All equivalent structures which employ the concepts disclosed in this specification and the appended claims should fall within the scope of the present invention.

What is claimed is:

1. A modification method of an image brightness of a photographing system, wherein the photographing system comprises an image capturing device, a moving object detection device, and a processing device; the image capturing device has an image capturing range; the moving object detection device has a detection range; the image capturing range partially overlaps with the detection range; the modification method of the image brightness of the photographing system comprises the following steps:

step A: providing a corresponding relationship data, wherein the corresponding relationship data has a plurality of predetermined location data corresponding to a plurality of predetermined locations in the detection range of the moving object detection device; each of the plurality of predetermined location data comprises a predetermined image coordinate area corresponding to each of the plurality of predetermined locations;

step B: detecting a location data of a moving object in the detection range by the moving object detection device;

step C: obtaining the predetermined image coordinate area of one of the plurality of predetermined location data, which corresponds to the location data, from the corresponding relationship data by the processing device according to the location data;

step D: controlling the image capturing device by the processing device for obtaining a first image captured by the image capturing device;

step E: calculating a first global exposure parameter of a whole of the first image and calculating a first local exposure parameter of a first local image, which corresponds to the predetermined image coordinate area, of the first image by the processing device;

step F: controlling the image capturing device by the processing device for obtaining another image captured by the image capturing device, wherein a whole of the another image has a global exposure parameter; a local image of the another image corresponding to the predetermined image coordinate area has a local exposure parameter, wherein the local exposure parameter is closer to an ideal exposure parameter than the first local exposure parameter; and Step G: outputting the another image as a frame of a video by the processing device;

wherein the modification method of the image brightness of the photographing system further comprises the following steps between step E and step F: controlling the image capturing device by the processing device for obtaining a second image captured by the image capturing device according to the first global exposure parameter; a whole of the second image has a second global exposure parameter, wherein the second global exposure parameter is the ideal exposure parameter; a second local image of the second image corresponding to the predetermined image coordinate area has a second local exposure parameter; wherein in step F, the processing device controls the image capturing device for obtaining the another image captured by the image capturing device according to a difference between the second global exposure parameter and the second local exposure parameter; the local exposure parameter is closer to the ideal exposure parameter than the second local exposure parameter.

2. The modification method of the image brightness of the photographing system as claimed in claim 1, wherein in step F, the processing device multiplies the difference by a proportion to obtain an adjusting value and controls the image capturing device for obtaining the another image captured by the image capturing device according to the adjusting value, so that the local exposure parameter is different from the second local exposure parameter by the adjusting value.

3. The modification method of the image brightness of the photographing system as claimed in claim 2, wherein the proportion is from 5% to 100%.

4. The modification method of the image brightness of the photographing system as claimed in claim 1, further comprising the following steps after step G:

step H: step B, step C, step D, step E, step F, and step G are repeatedly executed to form the video having a plurality of frames.

5. The modification method of the image brightness of the photographing system as claimed in claim 4, further comprising the following steps: when the moving object detection device does not detect the moving object in the detection range, step H is terminated.

6. The modification method of the image brightness of the photographing system as claimed in claim 1, wherein the photographing system comprises a light source module; in step B, the location data comprises a detection distance; the modification method of the image brightness of the photographing system comprises a controlling step of a light source before step D: controlling a luminous intensity of the light source module by the processing device according to the detection distance, so that the luminous intensity of the light source module is inversely proportional to the detection distance.

7. The modification method of the image brightness of the photographing system as claimed in claim 6, wherein the photographing system comprises an ambient light sensor; the modification method of the image brightness of the photographing system comprises the following steps before step D: detecting an ambient illuminance by the ambient light sensor; when the ambient illuminance is less than a predetermined illuminance, the processing device controls the light source module to activate and the controlling step of the light source is executed.

8. A modification method of the image brightness of the photographing system, wherein the photographing system comprises an image capturing device, a moving object detection device, and a processing device; the image capturing device has an image capturing range; the moving object detection device has a detection range; the image capturing range partially overlaps with the detection range; the modification method of the image brightness of the photographing system comprises the following steps:

step A: providing a corresponding relationship data, wherein the corresponding relationship data has a plurality of predetermined location data corresponding to a plurality of predetermined locations in the detection range of the moving object detection device; each of the plurality of predetermined location data comprises a predetermined image coordinate area corresponding to each of the plurality of predetermined locations;

step B: detecting a location data of a moving object in the detection range by the moving object detection device;

step C: obtaining the predetermined image coordinate area of one of the plurality of predetermined location data, which corresponds to the location data, from the corresponding relationship data by the processing device according to the location data;

step D: controlling the image capturing device by the processing device for obtaining a first image captured by the image capturing device;

step E: calculating a first global exposure parameter of a whole of the first image and calculating a first local exposure parameter of a first local image, which corresponds to the predetermined image coordinate area, of the first image by the processing device;

step F: controlling the image capturing device by the processing device for obtaining another image captured by the image capturing device, wherein a whole of the another image has a global exposure parameter; a local image of the another image corresponding to the predetermined image coordinate area has a local exposure parameter, wherein the local exposure parameter is closer to an ideal exposure parameter than the first local exposure parameter; and Step G: outputting the another image as a frame of a video by the processing device;

wherein in step A, each of the plurality of the predetermined location data of the corresponding relationship data comprises a predetermined distance and a predetermined angle; in step B, the location data comprises a detection distance and a detection angle; in step C, the processing device selects one of the plurality of predetermined location data, which comprises the predetermined distance corresponding to the detection distance and the predetermined angle corresponding to the detection angle, from the corresponding relationship data and then obtains the predetermined image coordinate area corresponding to the predetermined location data according to the predetermined location data being selected;

wherein in step A, the predetermined distance of each of the plurality of predetermined location data of the corresponding relationship data has a predetermined distance range corresponding to the predetermined distance; the predetermined angle of each of the plurality of predetermined location data has a predetermined angle range corresponding to the predetermined angle; in step C, when the processing device determines that the detection distance of the location data is between the predetermined distance of adjacent two of the plurality of predetermined location data, the predetermined distance corresponding to the predetermined distance range which covers the detection distance is selected; when the processing device determines that the detection angle of the location data is between the predetermined angle of adjacent two of the plurality of predetermined location data, the predetermined angle corresponding to the predetermined angle range which covers the detection angle is selected.

9. A modification method of the image brightness of the photographing system, wherein the photographing system comprises an image capturing device, a moving object detection device, and a processing device; the image capturing device has an image capturing range; the moving object detection device has a detection range; the image capturing range partially overlaps with the detection range; the modification method of the image brightness of the photographing system comprises the following steps:

step A: providing a corresponding relationship data, wherein the corresponding relationship data has a plurality of predetermined location data corresponding to a plurality of predetermined locations in the detection range of the moving object detection device; each of the plurality of predetermined location data comprises a predetermined image coordinate area corresponding to each of the plurality of predetermined locations;

step B: detecting a location data of a moving object in the detection range by the moving object detection device;

step C: obtaining the predetermined image coordinate area of one of the plurality of predetermined location data, which corresponds to the location data, from the corresponding relationship data by the processing device according to the location data;

step D: controlling the image capturing device by the processing device for obtaining a first image captured by the image capturing device;

step E: calculating a first global exposure parameter of a whole of the first image and calculating a first local exposure parameter of a first local image, which corresponds to the predetermined image coordinate area, of the first image by the processing device;

step F: controlling the image capturing device by the processing device for obtaining another image captured by the image capturing device, wherein a whole of the another image has a global exposure parameter; a local image of the another image corresponding to the predetermined image coordinate area has a local exposure parameter, wherein the local exposure parameter is closer to an ideal exposure parameter than the first local exposure parameter; and Step G: outputting the another image as a frame of a video by the processing device;

wherein in step A, each of the plurality of the predetermined location data of the corresponding relationship data comprises a predetermined distance and a predetermined angle; in step B, the location data comprises a detection distance and a detection angle; in step C, the processing device selects one of the plurality of predetermined location data, which comprises the predetermined distance corresponding to the detection distance and the predetermined angle corresponding to the detection angle, from the corresponding relationship data and then obtains the predetermined image coordinate area corresponding to the predetermined location data according to the predetermined location data being selected;

wherein in step A, each of the plurality of predetermined location data of the corresponding relationship data further comprises a predetermined energy; the predetermined energy has a predetermined energy range corresponding to the predetermined energy; in step B, the location data further comprises a detection energy; in step C, the processing device selects one of the predetermined location data, which comprises the predetermined distance corresponding to the detection distance and the predetermined angle corresponding to the detection angle, from the corresponding relationship data according to the detection distance of the location data and the detection angle of the location data and then obtains the predetermined energy range corresponding to the predetermined location data according to the predetermined location data being selected; when the processing device determines that the detection energy is within the predetermined energy range, the processing device obtains the predetermined image coordinate area corresponding to the predetermined location data according to the predetermined location data being selected and then step D is executed.

10. The modification method of the image brightness of the photographing system as claimed in claim 9, wherein when the processing device determines that the detection energy is greater than or less than the predetermined energy range, the processing device controls the image capturing device for obtaining an image captured by the image capturing device and then outputs the image as a frame of the video.

* * * * *